United States Patent
Yamada

(10) Patent No.: US 7,133,602 B2
(45) Date of Patent: Nov. 7, 2006

(54) POWER SUPPLY APPARATUS, MOTOR DRIVE CONTROL METHOD USING THE SAME AND MOTOR VEHICLE HAVING THE SAME MOUNTED THEREON

(75) Inventor: Kenji Yamada, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/562,968

(22) PCT Filed: Dec. 13, 2004

(86) PCT No.: PCT/JP2004/018969

§ 371 (c)(1),
(2), (4) Date: Dec. 29, 2005

(87) PCT Pub. No.: WO2005/069478

PCT Pub. Date: Jul. 28, 2005

(65) Prior Publication Data

US 2006/0165393 A1 Jul. 27, 2006

(30) Foreign Application Priority Data

Jan. 20, 2004 (JP) .............................. 2004-012099

(51) Int. Cl.
*H02P 21/00* (2006.01)
(52) U.S. Cl. ...................... 388/806; 318/801; 318/798; 318/815; 318/375; 318/376
(58) Field of Classification Search ................ 388/806; 320/128; 318/801, 798, 875, 778, 800, 806, 318/375, 376; 363/20
See application file for complete search history.

(56) References Cited

U.S. PATENT DOCUMENTS

| 5,710,699 A | 1/1998 | King et al. |
| 6,827,182 B1* | 12/2004 | Araki .......................... 187/290 |
| 6,917,179 B1 | 7/2005 | Komatsu et al. |
| 2002/0062183 A1* | 5/2002 | Yamaguchi et al. .......... 701/22 |
| 2003/0081440 A1 | 5/2003 | Komatsu et al. |
| 2004/0165868 A1 | 8/2004 | Sato et al. |

FOREIGN PATENT DOCUMENTS

| JP | A 2000-068573 | 3/2000 |
| JP | A 2001-275367 | 10/2001 |
| JP | A 2003-244801 | 8/2003 |
| JP | A 2003-309997 | 10/2003 |

* cited by examiner

*Primary Examiner*—Karen Masih
(74) *Attorney, Agent, or Firm*—Oliff & Berridge, PLC

(57) ABSTRACT

A power supply apparatus driving and controlling motor generators (MG1, MG2) includes a battery (10) generating an input voltage (Vb), a converter (110) converting the input voltage into a motor operating voltage (Vm) according to a voltage command value (Vmr), a smoothing capacitor (120) holding the motor operating voltage, inverters (131, 132) receiving the motor operating voltage and driving and controlling the motor generators (MG1, MG2) according to a torque command value (Tref), and a control unit (15) generating the voltage command value and the torque command value. When the motor generators (MG1, MG2) operate in the power running mode, the control unit (15) operates to make the torque command value smaller than an original required torque as necessary so as to allow the sum of electric power (Pm) consumed by the motors and an amount of change (Pc) in stored electric power of the smoothing capacitor (120) caused as the motor operating voltage increases not to exceed an output electric power limiting value (Pcvlm) of the converter (110).

17 Claims, 5 Drawing Sheets

US 7,133,602 B2

POWER SUPPLY APPARATUS, MOTOR DRIVE CONTROL METHOD USING THE SAME AND MOTOR VEHICLE HAVING THE SAME MOUNTED THEREON

TECHNICAL FIELD

The present invention relates to a power supply apparatus and a motor drive control method. In particular, the present invention relates to a power supply apparatus driving and controlling a motor by converting the level of an input DC (direct current) voltage, a method of driving and controlling a motor using the power supply apparatus, and a motor vehicle having the power supply apparatus mounted thereon.

BACKGROUND ART

Hybrid electric vehicles and electric vehicles including, in a drive apparatus thereof, an electric motor which transforms electrical energy into mechanical energy have recently been of great interest as environment-friendly vehicles. The hybrid electric vehicles are now partially commercialized. Some types of hybrid electric vehicles employ a structure having a power supply apparatus driving and controlling a motor, the apparatus being provided with the ability of converting the level of a DC voltage input thereto for allowing a voltage applied for driving the motor (hereinafter referred to as "motor operating voltage") to be adjustable according to operating conditions (e.g. number of revolutions, torque) of the motor, in order to highly efficiently drive the motor. In particular, the power supply apparatus is provided with a voltage step-up ability to make the motor operating voltage higher than the input DC voltage. Thus, a battery serving as a DC voltage source is reduced in size and the increased voltage allows the power loss to reduce, making it possible to improve efficiency of the motor.

For example, Japanese Patent Laying-Open No. 2003-244801 discloses a structure of driving and controlling an AC (alternating current) electric motor for driving wheels. In this structure, a DC voltage from a battery comprised of secondary cells is increased by means of a voltage step-up converter to generate a motor operating voltage, and the motor operating voltage is converted into an AC voltage by means of an inverter. With this structure, the voltage step-up ratio of the voltage step-up converter is set according to conditions of the motor and thus the motor can be operated highly efficiently.

For the aforementioned structure, however, a smoothing capacitor for stabilizing the motor operating voltage has to be provided on the output side of the converter which converts the level of the input voltage, as taught in Japanese Patent Laying-Open No. 2003-244801. Thus, when the motor operating voltage is changed according to operating conditions of the motor, the voltage held by the smoothing capacitor changes to cause stored electric power ($P = C \cdot V^2 / 2$) thereof to change.

Accordingly, when the motor operates under power running mode to convert electrical energy supplied thereto into mechanical energy (hereinafter referred to as "power running mode") and an instruction to increase the motor operating voltage is issued according to increase in number of revolutions and torque of the motor, the stored electric power of the smoothing capacitor is accordingly increased. In the process of the increase in stored electric power of the smoothing capacitor, the converter supplies not only electric power to be consumed by the motor but also the electric power corresponding to the increase in stored electric power of the smoothing capacitor. Consequently, a situation where the converter outputs excessive electric power could be caused.

In particular, when the battery serving as the input voltage source has its power supply ability higher than the capacity of a switching device that constitutes the converter and thus the output electric power of the converter is limited by the capacity (electric current capacity) of the switching device, the switching device could be broken under the aforementioned situation, resulting in a failure in hardware.

On the contrary, when the motor operates under regenerative braking control to convert mechanical braking energy into electrical energy (hereinafter referred to as "regenerative mode") and thereby supply the regenerative electric power from the motor to the battery and the motor operating voltage is decreased according to decreases in number of revolutions and torque of the motor, the regenerative electric power from the motor as well as electric power corresponding to the decrease in stored electric power of the smoothing capacitor are provided to the converter. Consequently, electric current passing through the switching device constituting the converter increases and the aforementioned situation could also be caused.

DISCLOSURE OF THE INVENTION

The present invention has been made for solving the above-described problems. An object of the present invention is to provide a power supply apparatus driving and controlling a motor by converting the level of an input DC voltage, the power supply apparatus being structured to be able to perform control in such a manner that prevents excessive electric current from flowing through a converter which is provided for converting the level, and to provide a motor vehicle having the power supply apparatus as described above.

A power supply apparatus according to the present invention is a power supply apparatus driving and controlling a motor and includes a DC power supply, a converter, an electric charge storage unit, a motor drive control unit, and a control unit. The converter converts a first DC voltage from the DC power supply into a second DC voltage according to a voltage command value to output the second DC voltage between a first power supply line and a second power supply line. The electric charge storage unit is chargeable and dischargeable and connected between the first power supply line and the second power supply line. The motor drive control unit receives the second DC voltage between the first power supply line and the second power supply line and converts, according to a driving force command value, the second DC voltage into electric power for driving and controlling the motor. The control unit adjusts, when the motor operates in a power running mode to convert electrical energy into mechanical energy, the driving force command value to allow the sum of electric power consumed by the motor according to the driving force command value and an amount of change in stored electric power of the electric charge storage unit, the change being caused as the second DC voltage changes, to be smaller than a limiting value of electric power output from the converter.

Preferably, the voltage command value is determined according to the number of revolutions and a required driving force of the motor and independently of the driving force command value.

Still preferably, the DC power supply is chargeable, the motor drive control unit converts, when the motor operates in a regenerative mode to generate regenerative electric power from mechanical energy, the electric power generated by the motor into the second DC voltage according to the voltage command value and outputs the second DC voltage between the first power supply line and the second power supply line, the converter converts, when the motor operates in the regenerative mode, the second DC voltage into the first DC voltage to charge the DC power supply, and the control unit adjusts, when the motor operates in the regenerative mode, the voltage command value as required based on a relation between a combination of the electric power generated by the motor and an amount of change in stored electric power of the electric charge storage unit that is caused by a change of the second DC voltage and a limiting value of electric power input to the converter.

Still preferably, when the motor operates in the regenerative mode, the voltage command value is adjusted by the control unit as required, after temporarily determined according to the number of revolutions and a required driving force of the motor.

Still preferably, the control unit inhibits, when the motor operates in the regenerative mode and the electric power generated by the motor exceeds the limiting value of electric power input to the converter, decrease of the voltage command value.

Still preferably, the control unit restricts, when the motor operates in the regenerative mode and the electric power generated by the motor is smaller than the limiting value of electric power input to the converter, an amount of decrease in the voltage command value so as to balance the amount of change in stored electric power of the electric charge storage unit that is caused by the change of the second DC voltage with a combination of the limiting value of electric power input to the converter and the electric power generated by the motor.

A motor vehicle according to the present invention includes a power supply apparatus as recited in any of claims 1 to 6, and an AC electric motor provided as the motor driven and controlled by the power supply apparatus and capable of driving at least one wheel. The converter is provided as a voltage step-up converter capable of making the second DC voltage higher than the first DC voltage. The motor drive control unit includes an inverter making conversion between the second DC voltage and an AC voltage for driving and controlling the AC electric motor.

A motor drive and control method according to the present invention is a motor drive and control method for driving and controlling a motor by a power supply apparatus, the power supply apparatus including: a DC power supply; a converter converting a first DC voltage from the DC power supply into a second DC voltage according to a voltage command value to output the second DC voltage between a first power supply line and a second power supply line; a chargeable and dischargeable electric charge storage unit connected between the first power supply line and the second power supply line; and a motor drive control unit converting, according to a driving force command value, the second DC voltage between the first power supply line and the second power supply line into electric power for driving and controlling the motor, and includes a first step of adjusting, when the motor operates in a power running mode to convert electrical energy into mechanical energy, the driving force command value to allow the sum of electric power consumed by the motor according to the driving force command value and an amount of change in stored electric power of the electric charge storage unit, the change being caused as the second DC voltage changes, to be smaller than a limiting value of electric power output from the converter.

Preferably, according to the motor drive and control method of the present invention, the voltage command value is determined according to the number of revolutions and a required driving force of the motor and independently of the driving force command value.

Still preferably, the motor drive and control method of the present invention further includes a second step. The DC power supply is chargeable, the motor drive control unit converts, when the motor operates in a regenerative mode to generate regenerative electric power from mechanical energy, the electric power generated by the motor into the second DC voltage according to the voltage command value and outputs the second DC voltage between the first power supply line and the second power supply line, the converter converts, when the motor operates in the regenerative mode, the second DC voltage into the first DC voltage to charge the DC power supply. The second step adjusts, when the motor operates in the regenerative mode, the voltage command value as required based on a relation between a combination of the electric power generated by the motor and an amount of change in stored electric power of the electric charge storage unit that is caused by a change of the second DC voltage and a limiting value of electric power input to the converter.

Still preferably, according to the motor drive and control method of the present invention, when the motor operates in the regenerative mode, the voltage command value is temporarily determined, before the second step is carried out, according to the number of revolutions and a required driving force of the motor.

Still preferably, according to the motor drive and control method of the present invention, the second step includes a sub step of inhibiting, when the motor operates in the regenerative mode and the electric power generated by the motor exceeds the limiting value of electric power input to the converter, decrease of the voltage command value.

Still preferably, according to the motor drive and control method of the present invention, the second step includes a sub step of restricting, when the motor operates in the regenerative mode and the electric power generated by the motor is smaller than the limiting value of electric power input to the converter, an amount of decrease in the voltage command value so as to balance the amount of change in stored electric power of the electric charge storage unit that is caused by the change of the second DC voltage with a combination of the limiting value of electric power input to the converter and the electric power generated by the motor.

Preferably, regarding the power supply apparatus and the motor drive and control method of the present invention, the amount of change in stored electric power is calculated based on the voltage command value. Preferably, in the first or second step, the amount of change in stored electric power is calculated based on a detected value of the second DC voltage.

With the power supply apparatus and the motor drive and control method according to the present invention, when the motor operates in the power running mode, the driving force command value is adjusted to reduce electric power consumed by the motor as required, so that electric power output from the converter does not become excessive, in consideration of a change in stored electric power of the electric charge storage unit that is caused as the second DC voltage (motor operating voltage) changes according to the voltage command value.

Accordingly, with the structure having the converter capable of varying the voltage (motor operating voltage) supplied to the motor drive control unit (inverter), overcurrent of the converter can be prevented to provide device protection. In particular, the voltage command value of the second DC voltage (motor operating voltage) is determined according to the number of revolutions and a required torque of the motor and thus efficiency of the motor can be improved.

Further, when the motor operates in the regenerative mode, the voltage command value is adjusted as required to restrict decrease of the second DC voltage (motor operating voltage) in consideration of a change in stored electric power of the electric charge storage unit, so that electric power input to the converter does not become excessive. Overcurrent of the converter can thus be prevented to provide device protection.

In particular, an amount of decrease of the voltage command value is restricted based on a comparison between the electric power generated by the motor and the limiting value of electric power input to the converter. Thus, the motor can be improved in efficiency within the range in which the limiting value of electric power input to the converter is not exceeded.

The motor vehicle according to the present invention is structured to have the converter mounted thereon that serves as a voltage step-up converter for varying a voltage input to the inverter (second DC voltage) driving and controlling the AC electric motor which drives wheels, and thereby improve efficiency in operation of the AC electric motor. When the AC electric motor operates in the electric motor mode, the driving force command value can be adjusted to reduce electric power consumed by the motor as required, so that electric power output from the converter does not become excessive, in consideration of a change in stored electric power of the electric charge storage unit that is caused as the second DC voltage changes according to the voltage command value. Accordingly, overcurrent of the converter can be prevented to provide device protection.

Further, when the AC electric motor operates in the regenerative mode, the regenerative electric power of the AC electric motor can be limited to prevent overcurrent of the converter and thereby provide device protection, without deterioration in braking ability.

Here, the change in stored electric power of the electric charge storage unit may be calculated based on the voltage command value so as to reduce a load of calculation for control.

Moreover, the change in stored electric power of the electric charge storage unit may be calculated based on a detected value of the second DC voltage so as to improve control accuracy.

BEST MODES FOR CARRYING OUT THE INVENTION

Figure 1:
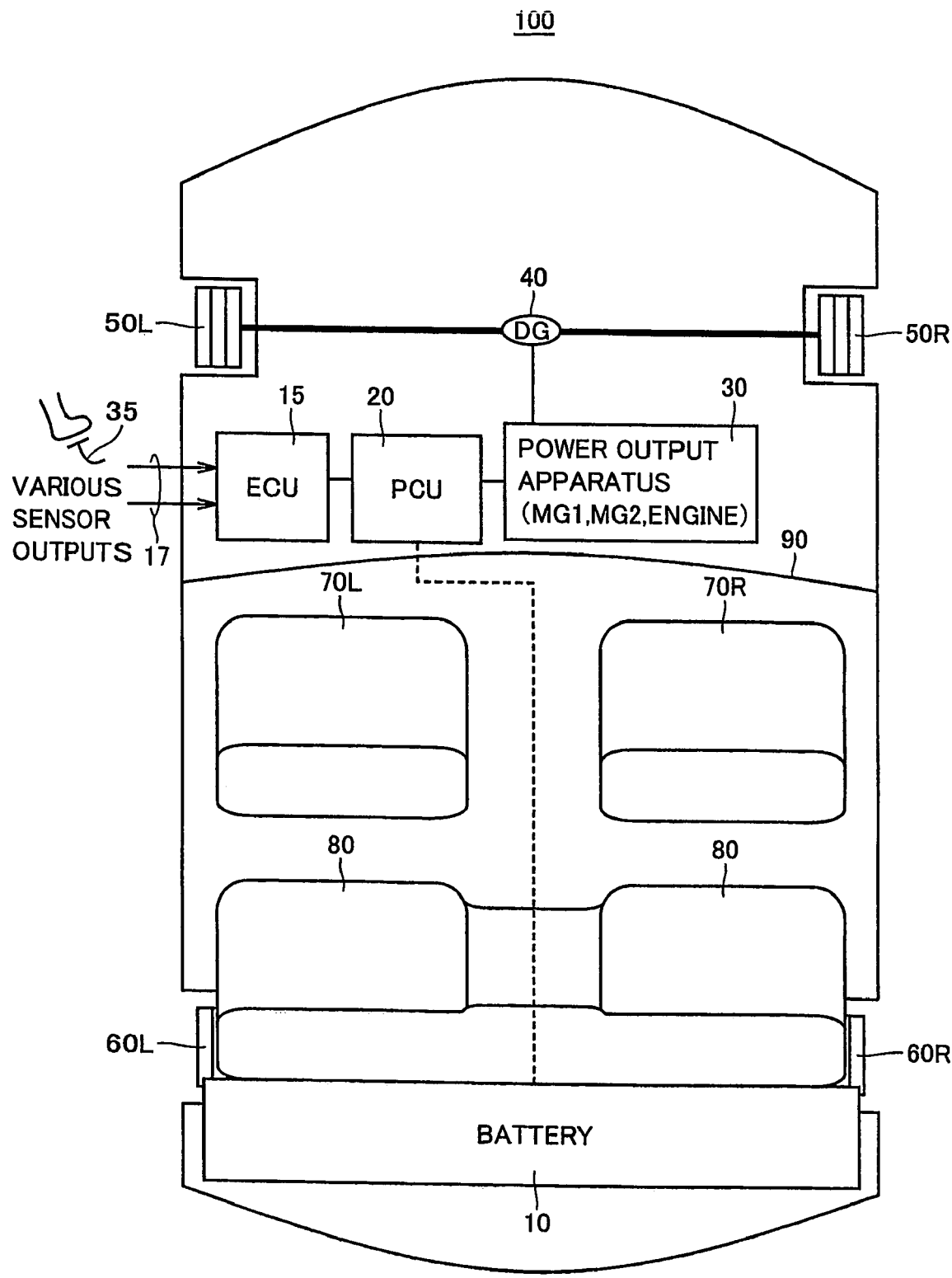
FIG. 1 is a block diagram illustrating a structure of a motor vehicle having a power supply apparatus according to the present invention.

An embodiment of the present invention is hereinafter described in detail with reference to the drawings. Here, like components in the drawings are denoted by like reference characters and the description thereof will not be repeated.

FIG. 1 is a block diagram illustrating a structure of a motor vehicle having a power supply apparatus according to the present invention.

Referring to FIG. 1, hybrid electric vehicle 100 of the present invention includes a battery 10, an ECU (Electronic Control Unit) 15, a PCU (Power Control Unit) 20, a motive power output apparatus (hereinafter referred to as "power output apparatus") 30, a DG (Differential Gear) 40, front wheels 50L, 50R, rear wheels 60L, 60R, front seats 70L, 70R, and a rear seat 80.

Battery 10 is comprised for example of nickel-hydride or lithium-ion secondary cells, supplies a DC voltage to PCU 20 and is charged with a DC voltage from PCU 20. Battery 10 is placed for example behind rear sheet 80 and electrically connected to PCU 20. PCU 20 generally represents an electric-power converter that is necessary in hybrid electric vehicle 100.

To ECU 15, various sensor outputs 17 of various sensors that indicate running conditions and vehicle conditions are provided. Various sensor outputs 17 include for example the pedal travel of an accelerator that is detected by a position sensor placed on an accelerator pedal 35 and an output of a wheel-speed sensor. ECU 15 comprehensively performs various control operations for hybrid electric vehicle 100.

Power output apparatus 30 includes an engine and motor generators MG1, MG2 provided as sources of motive power for driving the wheels. DG 40 transmits motive power from power output apparatus 30 to front wheels 50L, 50R and transmits a rotational force of front wheels 50L, 50R to power output apparatus 30.

Accordingly, power output apparatus 30 transmits motive power generated by the engine and/or motor generators MG1, MG2 via DG 40 to front wheels 50L, 50R and thereby drives front wheels 50L, 50R. Further, power output apparatus 30 generates electric power from a rotational force of motor generators MG1, MG2 that is originated in front wheels 50L, 50R and supplies the generated electric power to PCU 20. In other words, motor generators MG1, MG2 serve as an "AC electric motor" capable of driving at least one wheel.

When motor generators MG1, MG2 operate in the power running mode, PCU 20 follows a control instruction from ECU 15 to step up the DC voltage from battery 10 and convert the increased DC voltage into an AC voltage and thereby drive and control motor generators MG1, MG2 included in power output apparatus 30.

Further, when motor generators MG1, MG2 operate in the regenerative mode, PCU 20 follows a control instruction from ECU 15 to convert an AC voltage generated by motor generators MG1, MG2 into a DC voltage and thereby charge battery 10.

In hybrid electric vehicle 100 as discussed above, battery 10, PCU 20 and a portion of ECU 15 that controls PCU 20 constitute a "power supply apparatus" driving and controlling motor generators MG1, MG2.

A configuration of the power supply apparatus according to the present invention is now described.

Figure 2:
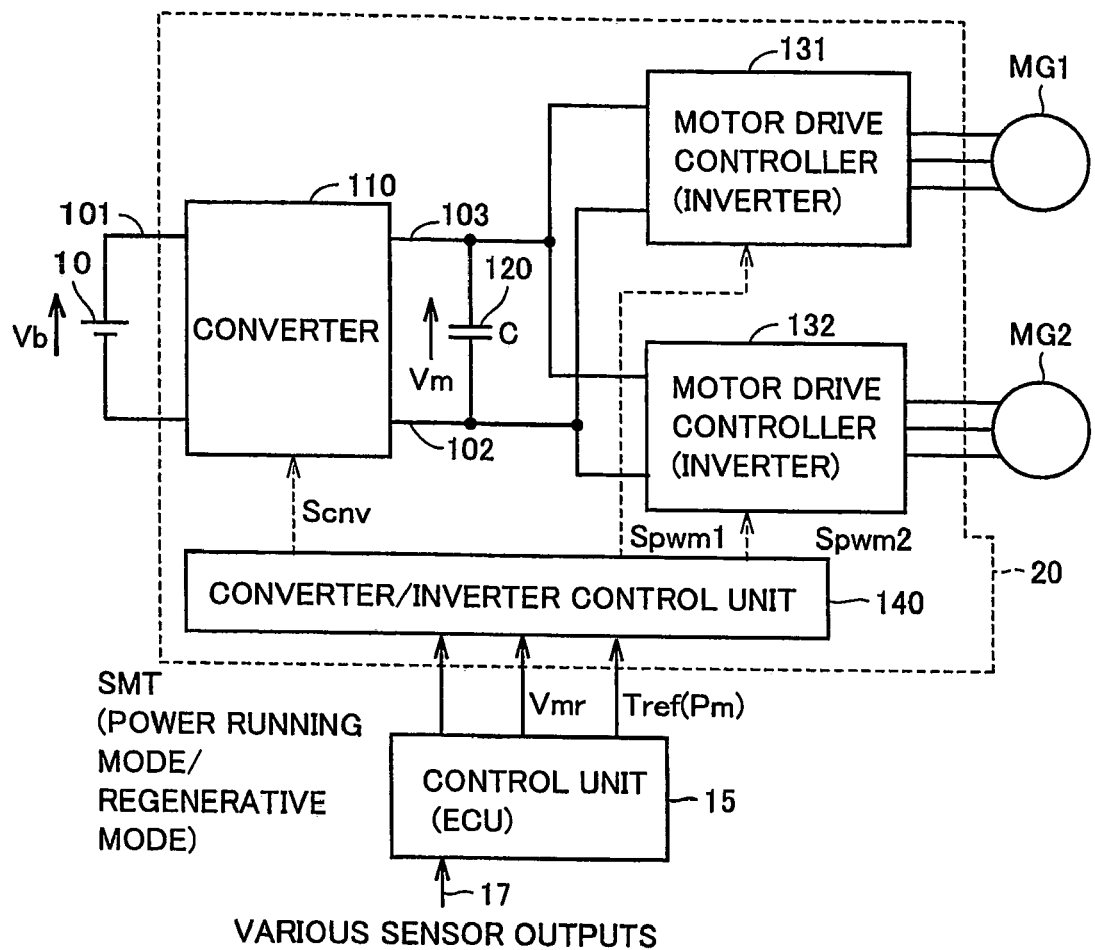
FIG. 2 is a block diagram illustrating a configuration of the power supply apparatus according to the present invention.

Referring to FIG. 2, the power supply apparatus of the present invention includes battery 10 corresponding to "DC power source," a portion of PCU 20 that is involved in drive and control of motor generators MG1, MG2 (this portion is also referred to as "PCU 20" hereinafter), and the portion of ECU 15 that is involved in control of PCU 20 (this portion is referred to as "control unit 15" hereinafter).

PCU 20 includes a converter 110, a smoothing capacitor 120, motor drive controllers 131, 132 associated respectively with motor generators MG1, MG2, and a converter/inverter control unit 140. In this embodiment, motor generators MG1, MG2 that are AC motors are driven and controlled. Therefore, the motor drive controllers are constructed of inverters. Motor drive controllers 131, 132 are thus referred to as inverters 131, 132 hereinafter.

Control unit 15 determines, based on various sensor outputs 17, a required torque Trq of motor generators MG1, MG2 in consideration for example of the distribution ratio of output power between the engine and the motor generators (this ratio is also referred to as "output ratio" hereinafter). Further, control unit 15 calculates an optimum motor operating voltage Vm# according to operating conditions of motor generators MG1, MG2.

Figure 3:
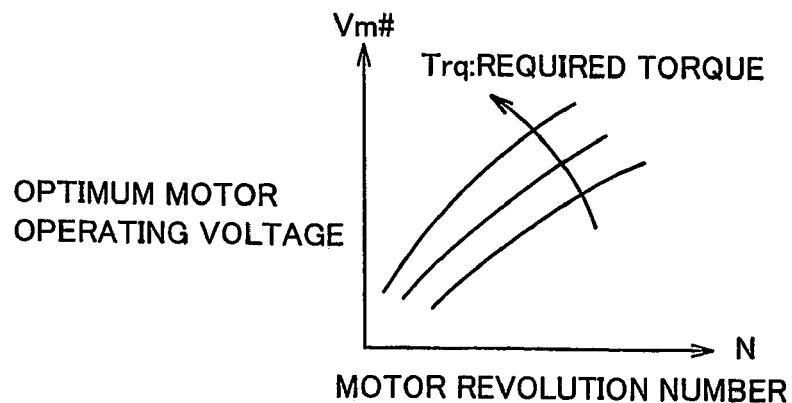
FIG. 3 schematically illustrates a manner of calculation of an optimum motor voltage.

As shown in FIG. 3, optimum operating voltage Vm# for improving efficiency of motor generators MG1, MG2 is determined based on the number of motor revolutions (hereinafter referred to as motor revolution number) N and required torque Trq. For the same required torque Trq, optimum motor operating voltage Vm# increases as motor revolution number N increases. For the same motor revolution number N, optimum motor operating voltage Vm# increases as required torque Trq increases.

Control unit 15 controls electric power balance, which is hereinlater described in detail, based on required torque Trq and optimum motor operating voltage Vm# and generates a voltage command value Vmr of a motor operating voltage Vm and a torque command value Tref of motor generators MG1, MG2.

Voltage command value Vmr and torque command value Tref are provided to converter/inverter control unit 140. To converter/inverter control unit 140, control unit 15 further provides an identification signal SMT indicating whether motor generators MG1, MG2 operate in the power running mode or the regenerative mode.

Following voltage command value Vmr from control unit 15, converter/inverter control unit 140 generates a converter control signal Scnv for controlling operation of converter 110. Following torque command value Tref from control unit 15, converter/inverter control unit 140 generates inverter control signals Spwm1, Spwm2 for controlling respective operations of inverters 131, 132.

Figure 4:
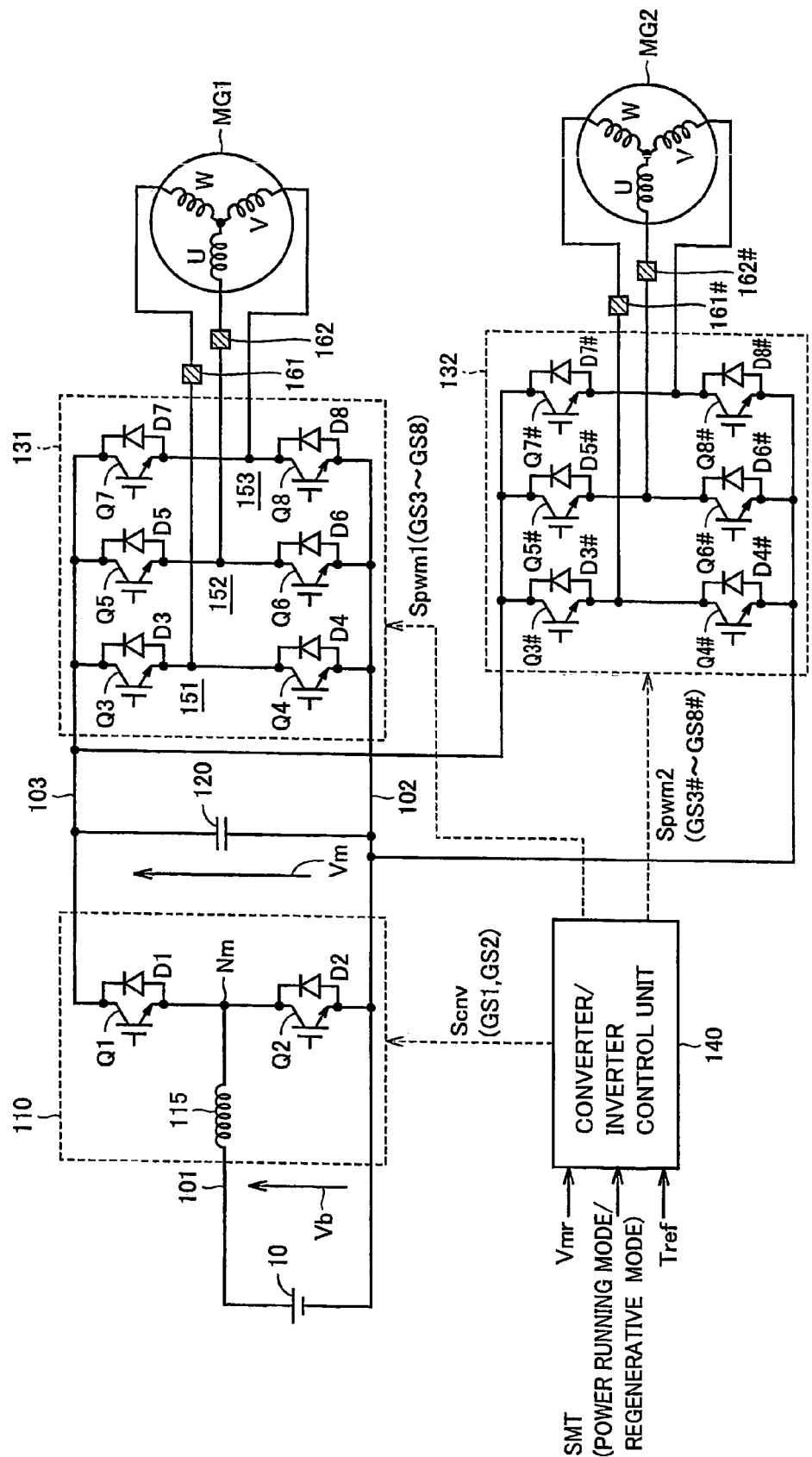
FIG. 4 is a circuit diagram showing a specific example of the configuration of a PCU shown in FIG. 2.

With reference to FIG. 4, a specific example of the configuration of PCU 20 shown in FIG. 2 and operation thereof are described.

Referring to FIG. 4, the positive electrode and the negative electrode of battery 10 are connected respectively to power supply lines 101, 102.

Converter 110 includes a reactor 115, switching elements Q1, Q2 and diodes D1, D2.

Switching elements Q1, Q2 are connected in series between power supply lines 103, 102. Reactor 115 is connected between power supply line 101 and a connection node Nm of switching elements Q1, Q2. Between respective collectors and respective emitters of switching elements Q1, Q2, respective anti-parallel diodes D1, D2 are connected for allowing electric current to flow from the emitter to the collector.

To respective gates of switching elements Q1, Q2, gate control signals GS1, GS2 corresponding to converter control signal Scnv are provided. In response to respective gate control signals GS1, GS2, turn-on/off of switching elements Q1, Q2 is controlled. As the switching elements of this embodiment, IGBT (Insulated Gate Bipolar Transistor) is employed for example.

Smoothing capacitor 120 is connected between power supply lines 103, 102.

Inverter 131 is a three-phase inverter comprised of switching elements Q3 to Q8 constituting a U-phase arm 151, a V-phase arm 152 and a W-phase arm 153 connected in parallel between power supply lines 103, 102. Between respective collectors and respective emitters of switching elements Q3 to Q8, anti-parallel diodes D3 to D8 are connected respectively.

To respective gates of switching elements Q3 to Q8, gate control signals GS3 to GS8 corresponding to inverter control signal Spwm1 are provided. By a portion of a drive apparatus (not shown), switching elements Q3 to Q8 are turned on/off in response to gate control signals GS3 to GS8.

The intermediate point of each phase arm of inverter 131 is connected to one end of a corresponding phase coil of motor generator MG1 which is a three-phase permanent magnet motor generator. Respective other ends of the phase coils are commonly connected to the intermediate point. Further, at least two of the three phases are provided with current sensors 161, 162 so that each phase current can be detected.

Inverter 132 is also a three-phase inverter similar to inverter 131 that is comprised of switching elements Q3# to Q8# and anti-parallel diodes D3# to D8#. To respective gates of switching elements Q3# to Q8#, gate control signals GS3# to GS8# corresponding to inverter control signal Spwm2 are provided. By a portion of the drive apparatus (not shown), switching elements Q3# to Q8# are turned on/off in response to gate control signals GS3# to GS8#.

The intermediate point of each phase arm of inverter 132 is connected to one end of a corresponding phase coil of motor generator MG2. Respective other ends of the phase coils of motor generator MG2 are commonly connected to the intermediate point. To at least two of the three phases, current sensors 161#, 162# are provided so that each phase current can be detected.

No limitation is imposed on the number of phases (three phases) and the form (permanent magnet motor) of motor generators MG1, MG2, and any arbitrary AC electric motors are applicable.

Operation of the power supply apparatus when motor generators MG1, MG2 operate in the power running mode is now described.

Battery 10 supplies an input voltage Vb corresponding to "first DC voltage" between power supply lines 101, 102.

Converter 110 receives input voltage Vb between power supply lines 101, 102 that is supplied from battery 10, steps up input voltage Vb through switching control of switching elements Q1, Q2 to generate motor operating voltage Vm corresponding to "second DC voltage" and outputs the generated voltage between power supply lines 103, 102. Power supply lines 103, 102 thus constitute "first power supply line" and "second power supply line" respectively. The voltage step-up ratio (Vm/Vb) at converter 110 is determined by the ratio between respective ON periods (duty ratio) of switching elements Q1, Q2.

Accordingly, converter/inverter control unit 140 determines the voltage step-up ratio at converter 110 based on voltage command value Vmr from control unit 15 and generates gate control signals GS1, GS2 so that this step-up ratio is satisfied.

Between power supply lines 103, 102, smoothing capacitor 120 that is chargeable and dischargeable and provided as "electric charge storage unit" smoothes motor operating voltage Vm provided from converter 110.

In response to gate control signals GS3 to GS8 and GS#3 to GS#8, inverters 131, 132 convert motor operating voltage Vm between power supply lines 103, 102 into an AC voltage for driving motor generators MG1, MG2.

Converter/inverter control unit 140 generates, according to respective output values of various sensors, inverter control signals Spwm1, Spwm2 to allow motor current to flow through each phase of motor generators MG1, MG2 so that a torque according to torque command value Tref and the number of revolutions according to a target number of revolutions are generated. For example, gate control signals GS3 to GS8 and GS3# to GS8# corresponding to inverter control signals Spwm1, Spwm2 are PWM signal waves generated in accordance with a generally employed control scheme.

The output values of various sensors include for example respective output values of position sensors and speed sensors of motor generators MG1, MG2, respective output values of current sensors 161, 162, 161#, and 162# and an output of a voltage sensor detecting motor operating voltage Vm.

In contrast, when motor generators MG1, MG2 operate in the regenerative mode, operation of the power supply apparatus is controlled in the following manner. Here, the regenerative mode of motor generators MG1, MG2 includes braking accompanied by regenerative power generation that is effected when a driver of hybrid electric vehicle 100 steps on the foot brake as well as deceleration (or acceleration) of the vehicle accompanied by regenerative power generation that is effected when the driver releases the accelerator pedal without operating the foot brake.

Converter/inverter control unit 140 detects from identification signal SMT from ECU 15 that hybrid electric vehicle 100 starts to operate in the regenerative mode. In response thereto, converter/inverter control unit 140 generates inverter control signals Spwm1, Spwm2 so that an AC voltage generated by motor generators MG1, MG2 is converted by inverters 131, 132 into a DC voltage.

Accordingly, inverters 131, 132 convert the AC voltage generated by motor generators MG1, MG2 into a DC voltage (i.e., motor operating voltage Vm) in accordance with voltage command value Vmr and output the generated voltage between power supply lines 103, 102.

In the regenerative mode, converter/inverter control unit 140 generates converter control signal Scnv so that the DC voltage (motor operating voltage Vm) provided from inverters 131, 132 is stepped down. In other words, in the regenerative mode, switching elements Q1, Q2 of converter 110 are turned on/off in response to respective gate control signals GS1, GS2 so that motor operating voltage Vm is stepped down and DC voltage Vb is output between power supply lines 101, 102. Battery 10 is thus charged with DC voltage Vb from converter 110. In this way, converter 110 can also step down motor operating voltage Vm to DC voltage Vb and thus has the function of a bidirectional converter.

The basic operation of the power supply apparatus that is involved in drive and control of the motor generators has been described. With the power supply apparatus of the present invention, in each of the power running mode and the regenerative mode of the motor generators, electric power balance is controlled to avoid generation of overcurrent of converter 110. As described below, the control of electric power balance can be implemented as operation for control that is programmed in advance in control unit (ECU) 15.

Figure 5:
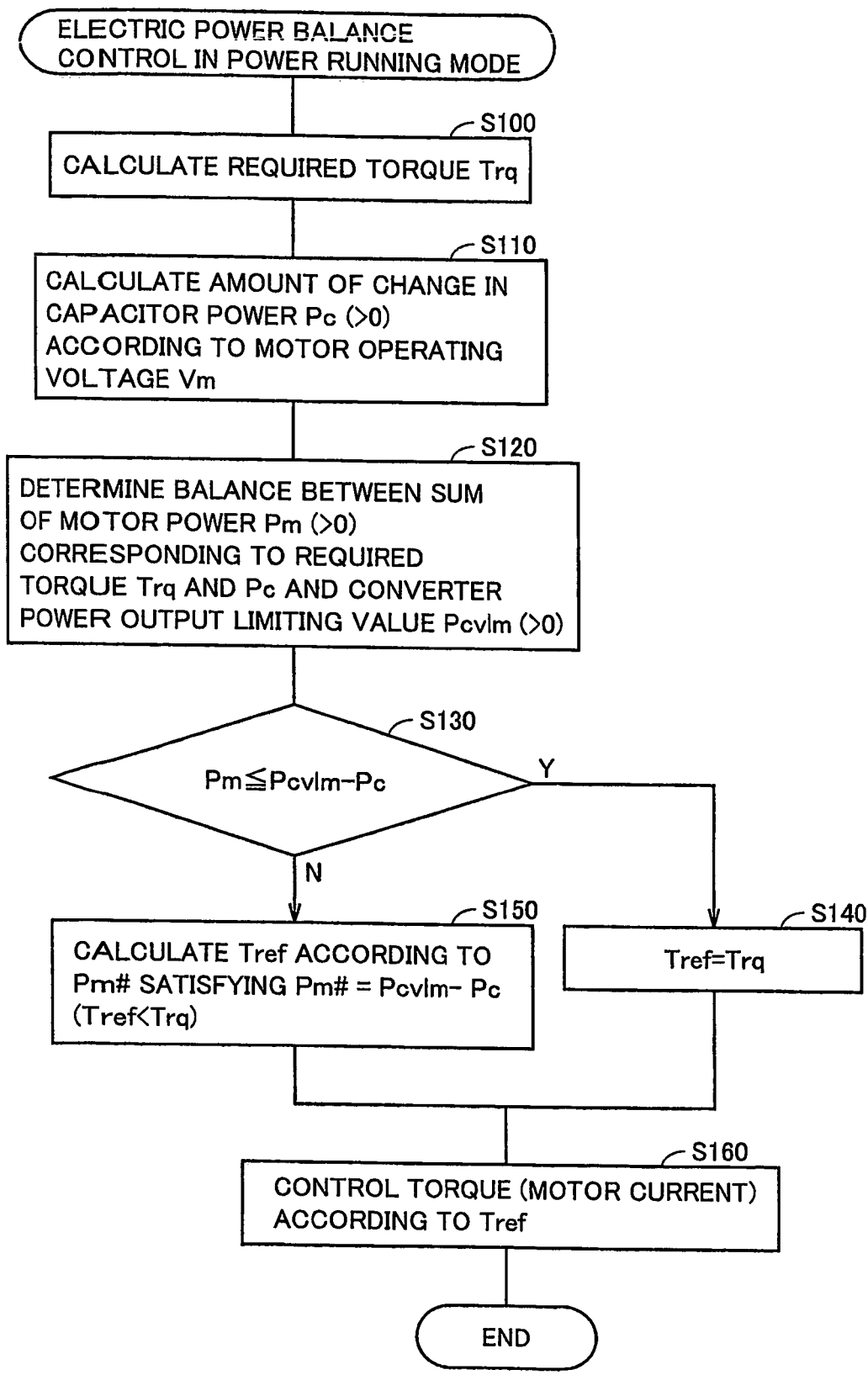
FIG. 5 is a flowchart illustrating electric power balance control in the power running mode.

FIG. 5 is a flowchart illustrating the electric power balance control by the control unit in the power running mode.

Referring to FIG. 5, in the power running mode, in response to operation of the accelerator by a driver for example, required torque Trq of motor generators MG1, MG2 is calculated (step S100). As shown in FIG. 3, according to the calculated required torque Trq and motor revolution number N, optimum motor operating voltage Vm# is determined.

Motor operating voltage Vm is controlled independently of the process shown in the flowchart of FIG. 5 and the control is implemented by switching control of converter 110 according to voltage command value Vmr corresponding to optimum motor operating voltage Vm# in FIG. 3. In other words, voltage command value Vmr is determined according to motor operating conditions and independently of torque command value Tref.

In response to the control of motor operating voltage Vm, an amount of change in capacitor power Pc, which is an amount of change in stored electric power (P=C·V²/2) of smoothing capacitor 120 is calculated for each control period (step S110).

This amount of change in capacitor power Pc is represented, using motor operating voltage Vm applied to smoothing capacitor 120 and a capacitance value C of smoothing capacitor 120, as an amount of change in P=C·V²/2 in a control period T by expression (1).

$$Pc = \left\{\frac{1}{2}C \cdot (Vm + \Delta Vm)^2 - \frac{1}{2}C \cdot Vm^2\right\} \cdot \frac{1}{T} \qquad (1)$$
$$= \frac{C}{2T}(2 \cdot Vm \cdot \Delta Vm + \Delta Vm^2)$$

In expression (1), Vm represents a motor operating voltage in the relevant control period and ΔVm represents the difference in motor operating voltage Vm between the control period and the immediately preceding control period. For example, in the i-th control period (i is natural number), the difference is represented by the equation ΔVm(i)=Vm(i)−Vm(i−1). Thus, when motor operating voltage Vm increases, the amount of change in capacitor power Pc is larger than zero (Pc>0).

For example, an output value of a voltage sensor that detects the motor operating voltage can be used as Vm in expression (1) to accurately calculate the amount of change in capacitor power Pc. Alternatively, voltage command value Vmr may be used as Vm in expression (1) for calculating the amount of change in capacitor power Pc in order to reduce the load of calculation.

Further, motor consumption power Pm corresponding to required torque Trq is calculated. Then, a determination about electric power balance is made, namely it is determined whether the sum of motor power Pm and the amount of change in capacitor power Pc determined in step S110 exceeds a limiting value of output electric power of the converter (hereinafter referred to as converter output power limiting value) Pcvlm (step S120).

Converter output power limiting value Pcvlm is restricted for example by the capacity of the power source, namely battery 10, and the electric power (current) capacity of switching elements Q1, Q2 constituting converter 110. In particular, when converter output power limiting value Pcvlm is restricted, not by the capacity of battery 10 but by the capacity of switching elements Q1, Q2, overcurrent could pass through switching elements Q1, Q2, which is a problem in terms of device protection.

Accordingly, by determining whether or not the condition defined by the following expression (2) is satisfied, it is determined whether or not motor power Pm does not exceed a value calculated by subtracting the amount of change in capacitor power Pc (>0) from converter output power limiting value Pcvlm (step S130).

$$Pm \leq Pcvlm - Pc \text{ (in the power running mode, } Pm, Pcvlm, Pc>0) \tag{2}$$

When the condition Pm≦Pcvlm−Pc is satisfied and electric power is consumed by motor generator MG1, MG2 exactly as defined by required torque Trq, it never occurs that motor power Pm exceeds converter output power limiting value Pcvlm. Then, torque command value Tref is set equal to required torque Trq (step S140).

On the contrary, when the condition Pm>Pcvlm−Pc is satisfied and motor generator MG1, MG2 consume electric power exactly as defined by required torque Trq, the sum of motor power Pm and the amount of change in capacitor power Pc exceeds converter output power limiting value Pcvlm. In this case, motor power Pm is limited so that motor power Pm does not exceed converter output power limiting value Pcvlm, particularly so that overcurrent is not generated in converter 110.

More specifically, a limiting value of the motor power, Pm#, which satisfies the condition represented by the expression Pm#=Pcvlm−Pc is calculated, and torque command value Tref is calculated according to this motor power Pm#. In other words, torque command value Tref is limited to be smaller than original required torque Trq (step S150).

In accordance with torque command value Tref determined and calculated in step S140 or S150, inverters 131, 132 are switching-controlled and the torque (i.e., motor current) of motor generators MG1, MG2 is controlled (step S160).

With the above-described control and the structure that allows the input voltage (motor operating voltage Vm) to the motor drive control unit (inverter) to be varied by the converter, the motor control and the converter control are performed in coordination with each other so that the output power supplied from the converter can be prevented from becoming excessive. In other words, the output electric power of converter 110 does not exceed its limiting value Pcvlm and thus overcurrent of converter 110 can be prevented to achieve device protection.

When a plurality of loads, namely motors (motor generators) are provided as this embodiment, the sum of consumption power of the motors may be calculated as motor power Pm.

Electric power balance control in the regenerative mode is now described. As discussed above, when the converter operates to increase the voltage, motor operating voltage Vm is increased according to motor operating conditions and the motor power of motor generators (MG1, MG2) in the power running mode is limited as required.

In contrast, when the motor generators operate in the regenerative mode, optimum motor operating voltage Vm# decreases according to motor operating conditions. Then, regarding the electric power balance control in the regenerative mode, braking ability deteriorates if the regenerative power of the motor generators is limited. Therefore, if control in the regenerative mode is performed in similar manner to that applied in the process of increasing the voltage, there could arise problems in terms of safety and driver's physical feelings. Accordingly, in the regenerative mode, the electric power balance control is carried out in the manner as described below.

Figure 6:
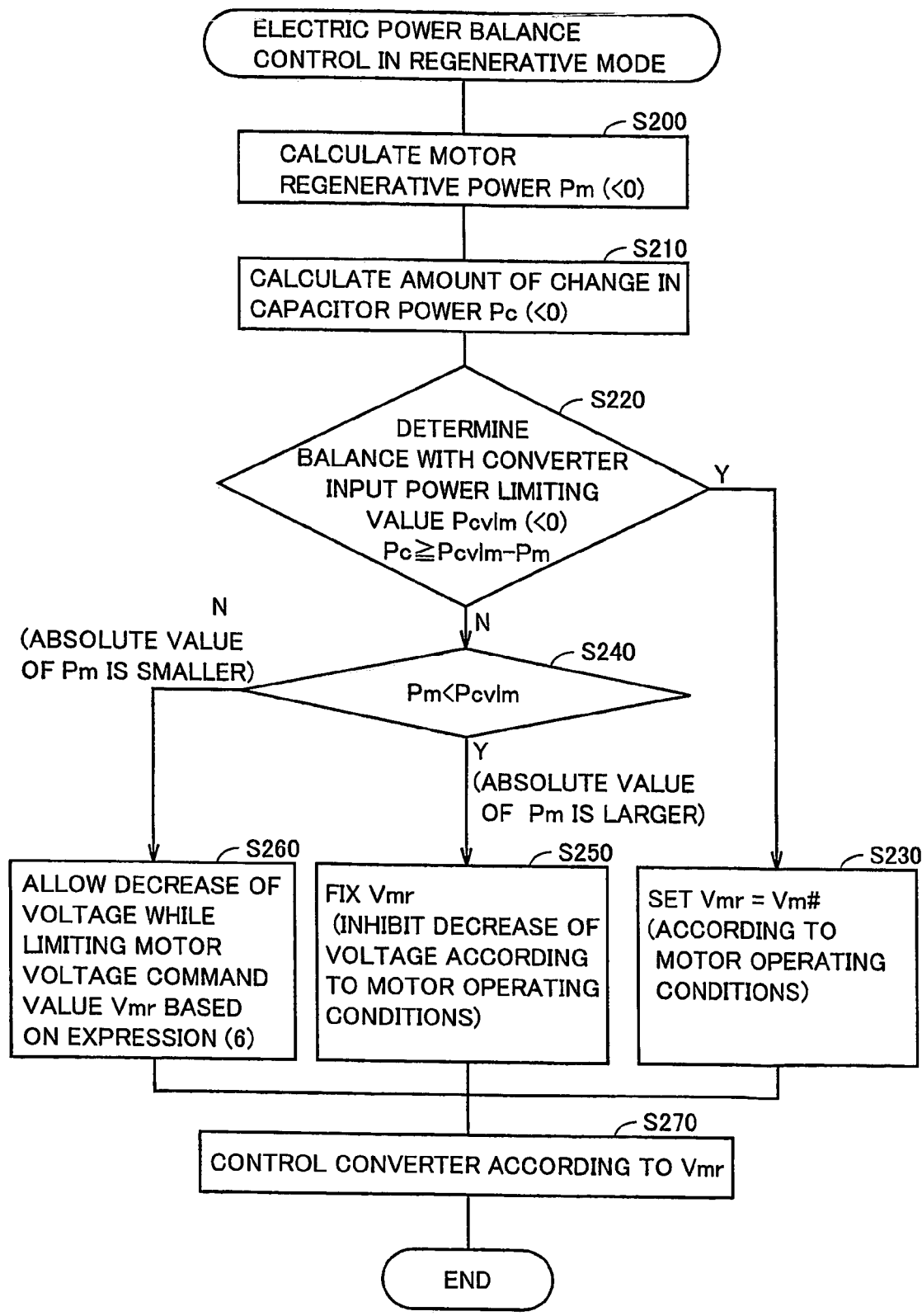
FIG. 6 is a flowchart illustrating electric power balance control in the regenerative mode.

FIG. 6 is a flowchart illustrating the electric power balance control in the regenerative mode.

Referring to FIG. 6, as the electric power balance control in the regenerative mode is started, control unit 15 calculates motor regenerative power Pm (<0) (step S200). As in step S120, when a plurality of motors (motor generators) that generate electric power are provided, the sum of regenerative power of these motors is calculated as motor power Pm.

Further, as in step S110 shown in FIG. 5, the amount of change in capacitor power Pc is calculated based on expression (1) (step S210).

Then, the balance between motor regenerative power Pm (<0) and amount of change in capacitor power Pc (<0) that are calculated in respective steps S200, S210 and a limiting value of electric power input to the converter (hereinafter "converter input power limiting value") Pcvlm (<0) is determined. Specifically, it is determined whether or not expression (4) that is a modified version of expression (3) with the polarity in expression (2) inverted is satisfied (step S220).

$$Pm \geq Pcvlm - Pc \text{ (in the regenerative mode, } Pm, Pcvlm, Pc<0) \tag{3}$$

$$Pc \geq Pcvlm - Pm \tag{4}$$

Under the condition that expression (4) is satisfied, even if motor operating voltage Vm is varied as shown in FIG. 3 according to motor operating conditions, it never occurs that input electric power to converter 110 becomes excessive. Thus, voltage command value Vmr of motor operating voltage Vm is set to optimum motor operating voltage Vm# that is calculated based on FIG. 3 (step S230).

When expression (4) is not satisfied, it is further determined whether or not motor regenerative power Pm exceeds converter input power limiting value Pcvlm (step S240).

When the condition Pm<Pcvlm is satisfied, namely the absolute value of motor regenerative power Pm is larger than the absolute value of converter input power limiting value Pcvlm, voltage command value Vmr is fixed to the same value as the one in the immediately preceding control period in order to inhibit decrease of motor operating voltage Vm that is done according to motor operating conditions (step S250).

In this case, while motor operating voltage Vm deviates from the optimum value in accordance with operating conditions and consequently power consumption of inverters 131, 132 increases, the regenerative power of the motor generators is not restricted and thus the braking ability does not deteriorate.

On the contrary, when the condition Pm≧Pcvlm is satisfied, namely the absolute value of motor regenerative power Pm is equal to or smaller than the absolute value of converter input power limiting value Pcvlm, motor operating voltage Vm cannot be decreased to optimum voltage Vm# precisely in accordance with motor operating conditions. However, motor operating voltage Vm is allowed to be decreased within the range in which the difference determined by Pcvlm−Pm is equal to the amount of change in capacitor power Pc. In other words, the amount of change in motor operating voltage (ΔVm) is determined within the range in which the following expression (5) is satisfied.

$$\frac{1}{T}\left\{\frac{C}{2}(Vm + \Delta Vm)^2 - \frac{C}{2} \cdot Vm^2\right\} = Pcvlm - Pm \quad (5)$$

The left side of expression (5) corresponds to the amount of change in capacitor power Pc as the motor operating voltage is changed from Vm to Vm+ΔVm in a control period T. Namely, Vm represents motor operating voltage Vm in the immediately preceding control period.

ΔVm in expression (5) is determined as shown by the following expression (6).

$$\Delta Vm = -Vm + \sqrt{-Vm^2 + \frac{2 \cdot T \cdot (Pcvlm - Pm)}{C}} \quad (6)$$

Voltage command value Vmr of the motor operating voltage is allowed to decrease while the amount of change ΔVm is limited based on expression (6) (step S260). In this way, based on the difference between motor regenerative power Pm and converter input power limiting value Pcvlm, the amount of decrease in voltage command value is limited so that motor operating voltage Vm is decreased in the range that does not exceeds converter input power limiting value Pcvlm so as to improve efficiency of motor generators MG1, MG2.

Thus, based on voltage command value Vmr that is determined in one of steps S230, S250 and S260, switching control of the converter is performed to control motor operating voltage Vm (step S270).

Accordingly, when motor generators MG1, MG2 operate in the regenerative mode, the control can be implemented without limiting regenerative power of motor generators MG2, MG2, in such a manner that allows electric power input to converter 110 not to exceed its limiting value Pcvlm in consideration of the amount of change in capacitor power. Overcurrent of converter 110 can thus be avoided and accordingly device protection is achieved.

While this embodiment includes the structure as illustrated above with which two AC electric motors are driven and controlled by the power supply apparatus, the present invention is applicable to a power supply apparatus and a motor drive control method for driving and controlling not only AC electric motors but also DC electric motors under the condition that the torque (electric power) of the motors can be controlled by the motor drive control unit (corresponding to the inverter in the present embodiment).

Further, the number of motors driven and controlled by the power supply apparatus is not limited to a particular number, and the present invention is applicable to a power supply apparatus driving and controlling an arbitrary number of motors. In this case, a power supply apparatus controlling and driving a plurality of motors may calculate the consumption power and regenerative power of the motors as shown in FIGS. 5 and 6 as the sum of consumption power and regenerative power of these motors.

Moreover, the power supply apparatus of the present invention is applicable to such vehicles as electric vehicles in addition to hybrid electric vehicles and further applicable to various equipment and systems having a motor to be driven and controlled.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The power supply apparatus as well as the motor drive control method of the present invention are applicable to equipment and systems having motor(s) mounted thereon and driven and controlled by a power supply apparatus, the equipment and systems including such vehicles having motor(s) mounted thereon as hybrid electric vehicles and electric vehicles.

The invention claimed is:

1. A power supply apparatus (20) driving and controlling a motor (MG1, MG2), comprising:
   a DC power supply (10);
   a converter (110) converting a first DC voltage (Vb) from said DC power supply into a second DC voltage (Vm) according to a voltage command value (Vmr) to output said second DC voltage between a first power supply line (103) and a second power supply line (102);
   a chargeable and dischargeable electric charge storage unit (120) connected between said first power supply line and said second power supply line;
   a motor drive control unit (131, 132) receiving said second DC voltage between said first power supply line and said second power supply line and converting, according to a driving force command vaiue (Tref), said second DC voltage into electric power for driving and controlling said motor; and
   a control unit (140) adjusting, when said motor operates in a power running mode, said driving force command value to allow the sum of electric power (Pm) consumed by said motor according to said driving force command value and an amount of change (Pc) in stored electric power of said electric charge storage unit, said change being caused as said second DC voltage changes, to be smaller than a limiting value (Pcvlm) of electric power output from said converter.

2. The powersupply apparatus according to claim 1, wherein
   said voltage command value (Vmr) is determined according to the number of revolutions (N) and a required driving force (Trq) of said motor (MG1, MG2) and independently of said driving force command value (Tref).

3. The power supply apparatus according to claim 1, wherein
   said DC power supply (10) is chargeable,
   said motor drive control unit (131, 132) converts, when said motor (MG1, MG2) operates in a regenerative mode, the electric power generated by said motor into said second DC voltage (Vm) according to said voltage command value (Vmr) and outputs said second DC voltage between said first power supply line (103) and said second power supply line (102),
   said converter (110) converts, when said motor operates in said regenerative mode, said second DC voltage into said first DC voltage (Vb) to charge said DC power supply, and
   said control unit (140) adjusts, when said motor operates in said regenerative mode, said voltage command value (Vmr) as required based on a relation between a combination of the electric power (Pm) generated by said motor and an amount of change (Pc) in stored electric power of said electric charge storage unit (120) that is caused by a change of said second DC voltage (Vm) and a limiting value (Pcvlm) of electric power input to said converter (110).

4. The power supply apparatus according to claim 3, wherein
when said motor operates in said regenerative mode, said voltage command value (Vmr) is adjusted by said control unit as required, after temporarily determined according to the number of revolutions (N) and a required driving force (Tref) of said motor (MG1, MG2).

5. The power supply apparatus according to claim 3, wherein
said control unit (140) inhibits, when said motor operates in said regenerative mode and the electric power (Pm) generated by said motor (MG1, MG2) exceeds the limiting value (Pcvlm) of electric power input to said converter, decrease of said voltage command value.

6. The power supply apparatus according to claim 3, wherein
said control unit (140) restricts, when said motor operates in said regenerative mode and the electric power (Pm) generated by said motor is smaller than the limiting value (Pcvlm) of electric power input to said converter (110), an amount of decrease in said voltage command value so as to balance the amount of change (Pc) in stored electric power of said electric charge storage unit (120) that is caused by the change of said second DC voltage (Vm) with a combination of the limiting value (Pcvlm) of electric power input to said converter (110) and the electric power (Pm) generated by said motor (MG1, MG2).

7. The power supply apparatus according to any of claims 1 to 6, wherein
said control unit (140) calculates said amount of change (Pc) in stored electric power based on said voltage command value (Vmr).

8. The power supply apparatus according to any of claims 1 to 6, wherein
said control unit calculates said amount of change (Pc) in stored electric power based on a detected value of said second DC voltage (Vm).

9. A motor vehicle (100) comprising:
a power supply apparatus (20) as recited in any of claims 1 to 6; and
an AC electric motor (MG1, MG2) provided as said motor driven and controlled by said power supply apparatus and capable of driving at least one wheel (50L, 50R),
said converter provided as a voltage step-up converter capable of making said second DC voltage (Vm) higher than said first DC voltage (Vb), and
said motor drive control unit including an inverter (131, 132) making conversion between said second DC voltage and an AC voltage for driving and controlling said AC electric motor.

10. A motor drive and control method for driving and controlling a motor (MG1, MG2) by a power supply apparatus (20), said power supply apparatus including: a DC power supply (10); a converter (110) converting a first DC voltage (Vb) from said DC power supply into a second DC voltage (Vm) according to a voltage command value (Vmr) to output said second DC voltage between a first power supply line (103) and a second power supply line (102); a chargeable and dischargeable electric charge storage unit (120) connected between said first power supply line and said second power supply line; and a motor drive control unit (131, 132) converting, according to a driving force command value (Tref), said second DC voltage between said first power supply line and said second power supply line into electric power for driving and controlling said motor, said method comprising a first step (S150) of adjusting, when said motor operates in a power running mode, said driving force command value to allow the sum of electric power (Pm) consumed by said motor according to said driving force command value and an amount of change (Pc) in stored electric power of said electric charge storage unit, said change being caused as said second DC voltage changes, to be smaller than a limiting value (Pcvlm) of electric power output from said converter.

11. The motor drive and control method according to claim 10, wherein
said voltage command value (Vmr) is determined according to the number of revolutions (N) and a required driving force (Trq) of said motor (MG1, MG2) and independently of said driving force command value (Tref).

12. The motor drive and control method according to claim 10, wherein
said DC power supply (10) is chargeable,
said motor drive control unit (131, 132) converts, when said motor (MG1, MG2) operates in a regenerative mode, the electric power (Pm) generated by said motor into said second DC voltage (Vm) according to said voltage command value (Vmr) and outputs said second DC voltage between said first power supply line (103) and said second power supply line (102),
said converter (110) converts, when said motor operates in said regenerative mode, said second DC voltage into said first DC voltage (Vb) to charge said DC power supply, and
said motor drive control method further comprises a second step (S240–S260) of adjusting, when said motor operates in said the regenerative mode, said voltage command value as required based on a relation between a combination of the electric power (Pm) generated by said motor and an amount of change (Pc) in stored electric power of said electric charge storage unit (120) that is caused by a change of said second DC voltage and a limiting value (Pcvlm) of electric power input to said converter.

13. The motor drive and control method according to claim 12, wherein
when said motor operates in said regenerative mode, said voltage command value (Vmr) is temporarily determined, before said second step (S240–S260) is carried out, according to the number of revolutions (N) and a required driving force (Trq) of said motor (MG1, MG2).

14. The motor drive and control method according to claim 12, wherein
said second step includes a sub step (S250) of inhibiting, when said motor operates in said regenerative mode and the electric power (Pm) generated by said motor (MG1, MG2) exceeds the limiting value (Pcvlm) of electric power input to said converter (110), decrease of said voltage command value (Vmr).

15. The motor drive and control method according to claim 12, wherein said second step includes a sub step (S260) of restricting, when said motor operates in said regenerative mode and the electric power (Vm) generated by said motor (MG1, MG2) is smaller than the limiting value (Pcvlm) of electric power input to said converter (110), an amount of decrease (Pc) in said voltage command value (Vmr) so as to balance the amount of change (Pc) in stored electric power of said electric charge storage unit that is caused by the change of said second DC voltage with a combination of the limiting value (Pcvlm) of electric power input to said converter (110) and the electric power (Vm) generated by said motor.

16. The motor drive and control method according to any of claims 10 to 15, wherein in said first or second step (S150, S240–S260), said amount of change (Pc) in stored electric power is calculated based on said voltage command value (Vmr).

17. The motor drive and control method according to any of claims 10 to 15, wherein in said first or second step (S150, S240–S260), said amount of change (Pc) in stored electric power is calculated based on a detected value of said second DC voltage (Vm).

\* \* \* \* \*